(12) United States Patent
Solon

(10) Patent No.: US 6,692,047 B1
(45) Date of Patent: Feb. 17, 2004

(54) ADD-ON AUTOMOBILE BUMPER AND SIDEWALL PROTECTIVE STRIPS MADE FROM RECLAIMED TIRE TREADS

(75) Inventor: Joseph J. Solon, Auburn, NY (US)

(73) Assignee: Interstate Recycling Corp., Auburn, NY (US)

( * ) Notice: Subject to any disclaimer, the term of this patent is extended or adjusted under 35 U.S.C. 154(b) by 0 days.

(21) Appl. No.: 10/376,272

(22) Filed: Mar. 3, 2003

(51) Int. Cl.[7] .............................................. B60R 19/42
(52) U.S. Cl. ....................................... 293/128; 293/142
(58) Field of Search ............................... 293/128, 142; 428/31, 54; 52/729.2; 152/555, 209.6; 280/770; 156/95

(56) References Cited

U.S. PATENT DOCUMENTS

| | | | | |
|---|---|---|---|---|
| 3,472,546 A | * | 10/1969 | Samuels | 293/128 |
| 3,606,431 A | * | 9/1971 | Kunevicius | 293/128 |
| 3,687,502 A | * | 8/1972 | Loew | 293/128 |
| 3,770,545 A | * | 11/1973 | Jackson | 293/128 |
| 3,843,475 A | * | 10/1974 | Kent | 293/128 |
| 3,982,780 A | * | 9/1976 | Keith | 293/128 |
| 4,010,297 A | * | 3/1977 | Wenrick | 293/128 |
| 4,277,526 A | * | 7/1981 | Jackson | 293/128 |
| 4,542,926 A | * | 9/1985 | Treber et al. | 293/128 |
| 4,671,974 A | * | 6/1987 | Murachi | 293/128 |
| 4,708,894 A | * | 11/1987 | Mabuchi et al. | 428/31 |
| 4,726,614 A | * | 2/1988 | Myers et al. | 293/128 |
| RE32,819 E | * | 1/1989 | Waugh | 293/128 |
| 4,880,674 A | * | 11/1989 | Shimizu | 293/128 |
| 5,139,830 A | * | 8/1992 | Gross | 293/128 |
| 5,328,731 A | * | 7/1994 | Zoller | 428/31 |
| 5,340,630 A | * | 8/1994 | Tripp | 428/54 |
| 5,399,393 A | * | 3/1995 | Zoller | 293/128 |
| 5,412,921 A | * | 5/1995 | Tripp | 52/729.2 |
| 5,520,765 A | * | 5/1996 | Zoller | 293/128 |
| 5,536,540 A | * | 7/1996 | Borys et al. | 293/128 |
| 5,587,030 A | * | 12/1996 | Herbelleau | 152/555 |
| 5,660,897 A | * | 8/1997 | Maki | 293/128 |
| 5,709,912 A | * | 1/1998 | Goto et al. | 293/128 |
| 5,810,406 A | * | 9/1998 | Reid et al. | 293/128 |
| 5,868,880 A | * | 2/1999 | Pouille et al. | 152/209.6 |
| 5,989,657 A | * | 11/1999 | Wurz et al. | 293/128 |
| 6,186,564 B1 | * | 2/2001 | Ashcroft | 293/128 |
| 6,283,518 B1 | * | 9/2001 | Burtin | 293/142 |
| 6,315,327 B1 | * | 11/2001 | Woolsey | 280/770 |
| 6,372,311 B2 | * | 4/2002 | McCormack | 293/128 |
| 6,444,067 B1 | * | 9/2002 | Bove et al. | 156/95 |
| 6,527,319 B1 | * | 3/2003 | Martel | 293/128 |
| 6,572,163 B1 | * | 6/2003 | Pickett | 293/142 |
| 2002/0105197 A1 | * | 8/2002 | Unterwagner | 293/128 |

* cited by examiner

*Primary Examiner*—Kiran Patel
(74) *Attorney, Agent, or Firm*—Laurence R. Brown

(57) ABSTRACT

A flexible impact energy absorption resilient and flexible rubber strip accessory has an adhesive layer for affixing it to an exterior curved automobile body surface. An inexpensive preferred embodiment is formed using tire tread strips cut from the carcasses of discarded automobile tires. Thus, steel belted tires provide embedded reinforcement for absorbing higher levels of impact energy without any visible damage to the tread strip or the adjacent car body surface upon which it is affixed. This accessory has an adhesive layer for attachment to a car surface having a manually protective paper or plastic cover so that it may be retrofit upon an exterior surface of an automobile without requiring any special tools. The accessory is universally adaptable to a large range of automobile body styles.

4 Claims, 2 Drawing Sheets

Figure 1:
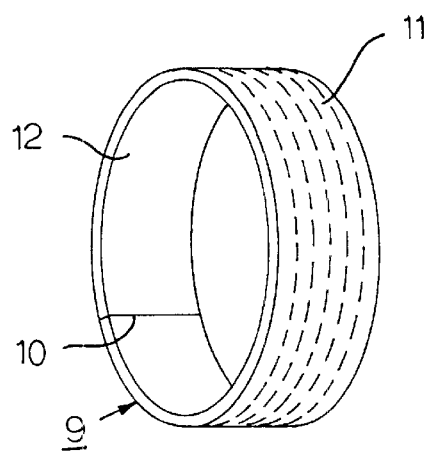

ADD-ON AUTOMOBILE BUMPER AND SIDEWALL PROTECTIVE STRIPS MADE FROM RECLAIMED TIRE TREADS

TECHNICAL FIELD

This invention relates to bumper and sidewall protective strips for protecting automobiles from impact damage, and more particularly it relates to forming resilient and flexible protective strips of durable rubber that may be retrofit on curved portions of an automobile exterior surface as an add-on auxiliary protective member.

BACKGROUND

Automobile body exterior surfaces are curved, rigid and inflexible with painted and plated exterior surfaces which have a propensity for becoming scratched, indented, scarred or otherwise mutilated by impacts occurring in the course of use. In particular, side door panels are subject to denting from careless opening of car doors parked alongside, and bumpers or adjacent surfaces are often damaged by careless bumper to bumper impact when parallel parked as attempting parkers maneuver back and forth. Such impact damage may be reduced or eliminated by protective strips adhered to the exterior body surface. However, to maintain custom impact protection fittings for different automobile models as in the present state of the prior art is expensive and requires large inventories of many variations of automobile styling. Thus, it is difficult to imagine a universal styling that fits many different car models and body shapes.

One known automobile side molding configuration is disclosed in U.S. Pat. No. 4,671,974, Jun. 9, 1987 to Tatsuya Murachi for SIDE MOLD. These moldings ad deficient in several respects. For example, when attached to automobile door surfaces they present a slick, rigid impact surface which encourages sliding and attendant scratches or dents. Also their rigidity tends to transfer impacts through to the body surface or show visible damage on the moldings. Furthermore, the rigid molding configuration is not readily manufactured for attachment to curved surfaces on the exterior car body surface, such as a bumper.

It is therefore an object of this invention to provide an inexpensive universal and durable protective accessory for attachment to curved automobile exterior surfaces, which absorbs impact energy and significantly reduces or eliminates impact damage such as scratches, indents and other visible defects including damage to the exposed accessory surface.

DISCLOSURE OF THE INVENTION

An inexpensive impact protection accessory readily retrofit upon the exterior surfaces of an automobile without use of special tooling or external fittings matching apertures in a car body surface is provided by this invention. The accessory has a durable flexible and resilient body that conforms readily to curved exterior surfaces of an automobile. Thus, the accessory is ideal either for positioning universally on automobile bumpers, or curved door sidewalls of various car models. A rubber body provides durability, flexibility, and resilience for absorbing impact energy without residue damage or visible impairment. In a preferred embodiment the protective accessory is a strip of rubber tread obtained from the body of a discarded tire carcass. With steel belted tires, the additional advantage of internal reinforcement is inexpensively obtained. These rubber strips are secured to the external surfaces of an automobile by means of an adhesive strip overlaid by a protective film or paper exterior surface that is removed as the strip is adhered adhesively to the exterior car surface.

Other features and advantages of the invention will be suggested throughout the following specification, claims and drawings.

THE DRAWINGS

In the accompanying drawings similar reference characters found in the several views represent similar features, to facilitate comparison.

Figure 2:
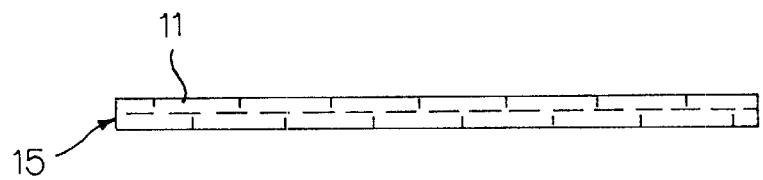
Figure 3:
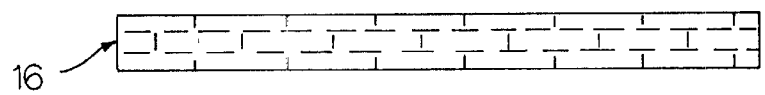
Figure 4:
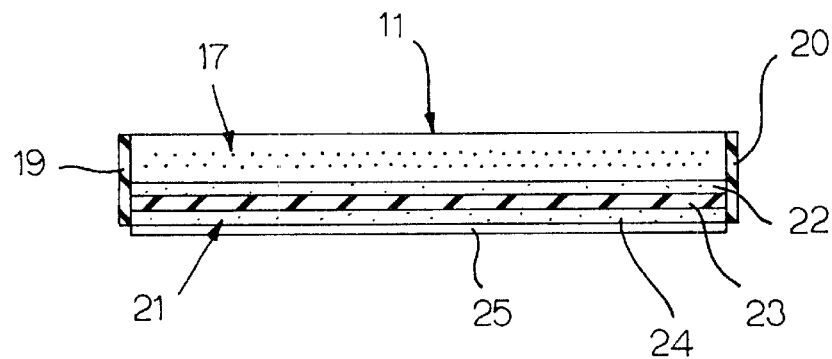
Figure 5:
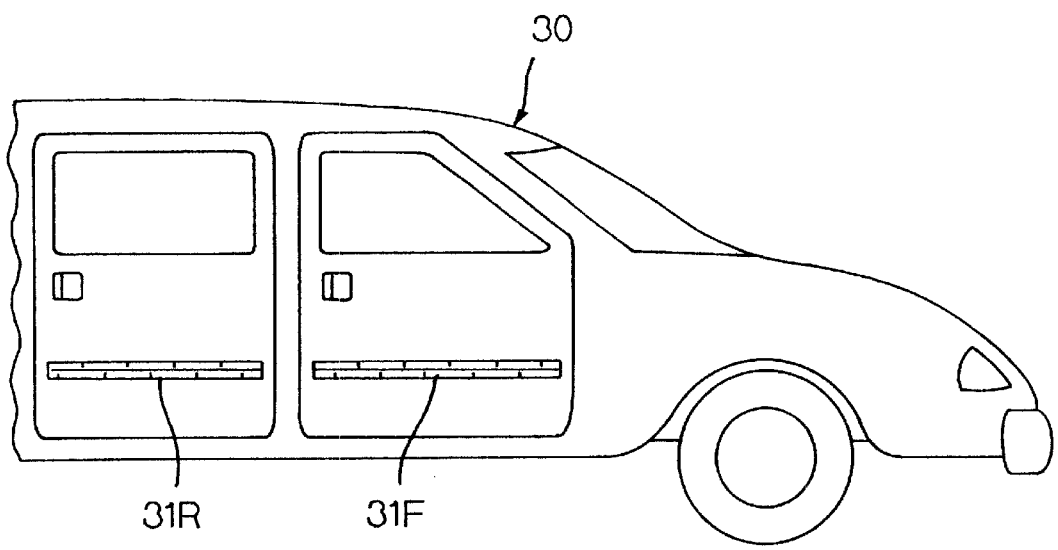
Figure 6:
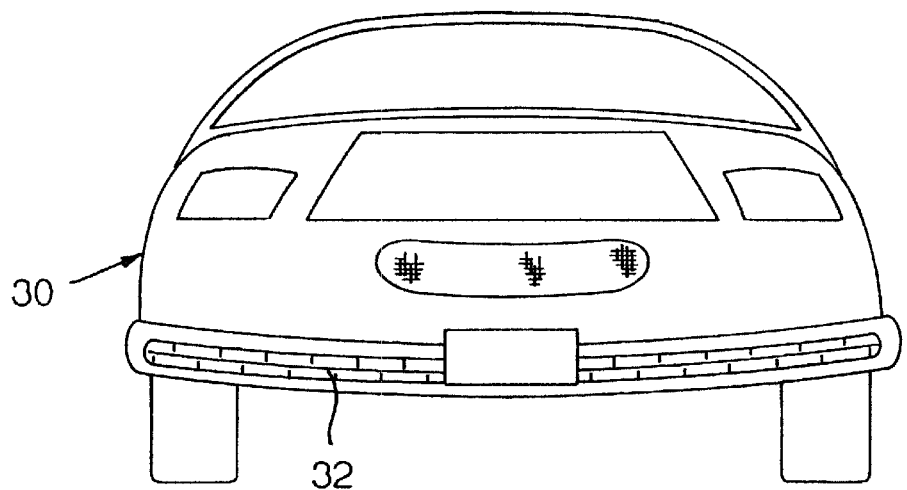

FIG. 1 shows in perspective view a tire tread portion removed from a discarded tire carcass, FIGS. 2 and 3 show in plan view the outer tread of respective narrower and wider strips cut from the discarded tire carcass respectively configured for retrofit on side door panels and bumper surfaces on an exterior car surface, FIG. 4 shows an end view section of a damage protection strip formed from steel belted automobile tires with accompanying adhesive surface adapted to be attached to an automobile outer surface, FIG. 5 is a sketch of an automobile having door panels retrofit with the damage protection strips afforded by this invention, and FIG. 6 is a sketch of an automobile having a front bumper retrofit with the damage protection strips of this invention.

SPECIFICATION

In FIG. 1, the basic raw material of this embodiment comprises a tread strip 9 cut from a discarded tire carcass having a transverse slit 10, and presenting an outer tire tread surface 11 with a smooth inner surface 12. When cut through at the slit 10 the flexible tire tread strip readily conforms to either flat or curved surfaces. Narrower strips 15, 16 of different widths cut from the tread strip 9 are shown in FIGS. 2 and 3.

The narrower strip 15, typically in the order of one inch wide, is adapted for securing to the side door panel outer surfaces of an automobile. There they resiliently absorb impact energy and return to original shape without showing any visible damage, scratching or denting when encountering carelessly opened car doors from cars parked alongside the automobile, as hereinafter discussed in connection with FIG. 5. The wider strip 16 of FIG. 3, typically in the order of two inches wide, is adapted for securing to the curved surface of an automobile bumper, as hereinafter discussed in connection with FIG. 6.

As shown in FIG. 4, the strips 15 and 16 are supplied with a double sided adhesive layer 21 secured to the smooth inner surface 12 of the tire tread strips. Note the embedded steel wires 17 available from steel belted tire treads, which serve as reinforcement thus permitting greater impact energy to be absorbed without damage. Protective adhesive strips 19, 20, are adhesively attached (not shown) to respective sidewall edges of the tread strips to protectively cover the sharp ends of steel wires. These tapes 19, 20 and the adhesive layer 21 are current commercially available products, such as the "3M" brand product lines obtainable from Minnesota Mining and Manufacturing company.

The adhesive tape 21 has two outer surfaces 22, 24 adhesively coated on an intermediate layer 20, preferably an impact absorbent material such as polyethylene. A manually removable paper or plastic film cover layer 25 attached to the exposed outer adhesive layer 24 permits the protective strip of this invention to be installed without any special tooling or intermediate accessories fitting into apertures in a car door panel for example.

The entire exposed surface of the protective strip of FIG. 4 can be spray painted, or the like, with a silver colored aluminum surface or a white surface, for example, to match the exterior of a white automobile.

The automobile 30 of FIG. 5 is shown with the narrower tire tread strips 31F and 31R of appropriate length to be attached to the external automobile body surfaces of the respective front and rear door panels. In the automobile 30 shown in FIG. 5, the wider strip 32 has appropriate length to be attached to the curved front bumper surface.

Improvements to the art have been hereinbefore set forth in the inexpensive yet superior performing protective rubber strips provided by this invention for simplified retrofit on exterior automobile surfaces. The flexibility of the rubber strips permit mounting on curved exterior surfaces of an automobile such as bumpers, and the resilience of the strips absorb impact energy without showing any visible impact damage such as scratching or denting of the automobile painted surfaces. Furthermore the invention uses discarded tire carcasses to prevent damage to the environment when stored in outside dumps.

Accordingly those novel features of the invention identifying the nature of the invention are set forth with particularity in the following claims.

What is claimed is:

1. A flexible impact protection accessory for retrofit upon curved exterior surfaces of an automobile, comprising in combination, a durable resilient rubber strip having the property of indenting upon impact to absorb impact energy and return to its original shape without evidence of damage to the strip or an exterior car surface upon which it is affixed, and means for securing the strip in place upon an exterior surface of an automobile, wherein said rubber strip is a treaded strip cut out of a reclaimed tire carcass with opposed resilient tread and inner carcass surface facings, wherein the tread surface facing is positioned outwardly to receive impact; wherein the treaded strip comprises a strip cut out of a steel belted tire carcass; wherein said resilient strip has opposite sides exposing steel belt wires contained in the steel belted tire carcass on the opposite sides of the treaded strip, further comprising a protective surface adhered to said opposite sides to cover the exposed steel belt wires.

2. The protection accessory of claim 1, wherein the means for securing the protection accessory strip in place comprises an intermediate layer adhesively coated on opposite surfaces, one of said opposite surfaces being adhesively attached to the rubber strip and the other having a manually removable protective layer to be removed before the accessory is affixed to the exterior surface of the automobile.

3. The protection accessory of claim 1 wherein the rubber strip has a width and length adapted for attachment to a curved bumper surface of the automobile.

4. The protection accessory of claim 1 wherein the rubber strip has a width and length adapted for attachment to car door surfaces of the automobile.

* * * * *